United States Patent
Nakane et al.

(10) Patent No.: US 7,875,684 B2
(45) Date of Patent: Jan. 25, 2011

(54) THERMOSETTING WATER-BASED PAINT AND COATING FILM-FORMING METHODS

(75) Inventors: Noritoshi Nakane, Yokohama (JP); Yoshiyuki Yukawa, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 1188 days.

(21) Appl. No.: 11/311,307

(22) Filed: Dec. 20, 2005

(65) Prior Publication Data

US 2006/0135651 A1 Jun. 22, 2006

(30) Foreign Application Priority Data

Dec. 22, 2004 (JP) ............... 2004-370683

(51) Int. Cl.
 *C08F 265/10* (2006.01)
(52) U.S. Cl. ............ 525/902; 525/232; 524/556; 523/201
(58) Field of Classification Search ......... 525/902, 525/232; 523/201; 524/556
 See application file for complete search history.

(56) References Cited

U.S. PATENT DOCUMENTS

| | | | |
|---|---|---|---|
| 4,403,003 A | | 9/1983 | Backhouse |
| 5,021,469 A | * | 6/1991 | Langerbeins et al. ........ 523/201 |
| 5,620,796 A | * | 4/1997 | Kawabata et al. ..... 428/355 AC |
| 6,541,070 B2 | * | 4/2003 | Magoshi et al. .......... 427/407.1 |
| 6,765,049 B2 | * | 7/2004 | Lorah et al. ................ 524/445 |
| 2004/0034147 A1 | | 2/2004 | Zama |

FOREIGN PATENT DOCUMENTS

| | | |
|---|---|---|
| EP | 1 055 687 A3 | 12/2000 |
| GB | 2 359 557 A | 8/2001 |
| HU | 208032 | 6/1991 |
| JP | 3-14869 | 2/1991 |
| JP | 4-93374 | 3/1992 |
| JP | 9-77842 | 3/1997 |
| JP | 2001-104878 | 4/2001 |

\* cited by examiner

*Primary Examiner*—Satya B Sastri
(74) *Attorney, Agent, or Firm*—Wenderoth, Lind & Ponack, L.L.P.

(57) ABSTRACT

The invention discloses thermosetting water-based paint comprising water-dispersible acrylic polymer particles which are obtained through multi-stage emulsion polymerization of radical polymerizable unsaturated monomers using a specific reactive emulsifying agent, said monomers comprising amido-containing radical polymerizable unsaturated monomer having at least 2 radical polymerizable unsaturated groups per molecule, methacrylic acid and hydroxyl-containing radical polymerizable unsaturated monomer; and coating film-forming methods which use the thermosetting water-based paint.

16 Claims, No Drawings

THERMOSETTING WATER-BASED PAINT AND COATING FILM-FORMING METHODS

TECHNICAL FILED

This invention relates to thermosetting water-based paint which contains specific water-dispersible acrylic polymer particles and is capable of forming coating film of excellent finished appearance such as metallic texture and coated surface smoothness; and also to coating film-forming methods using the water-based paint.

BACKGROUND ART

In the field of paint, reduction in use rate of organic solvent in paint has been an important subject, from the viewpoints of environmental preservation and resource saving. As a means to deal with this problem, recently research on waterborne paint and means to increase solid content of paint (high solid paint) for reducing organic solvent content of paint is under progress.

As water-based paint used in the field of paint for automobiles, for example, thermosetting water-based paint comprising polycarboxylic acid resin, amino resin, linear low molecular weight polyester diol and benzoine is known (see e.g., JP Hei 4(1992)-93374A) which, however, has low solid concentration and gives insufficient coating film surface smoothness and unsatisfactory coating film performance such as water resistance.

Of paints for automobiles, particularly top coat paints are required to form coating film of excellent appearance and quality. In metallic coating, it is required to provide coating film of excellent finished appearance such as the metallic texture, by favorably orienting flaky effect pigment such as of aluminum in metallic base paint used.

As a water-based metallic base paint to be used in such metallic coating, for example, a base coat composition which allows the metallic paint therein to exhibit the maximum flip-flop effect and gives excellent metallic texture, characterized by having the water-based base paint contain fine particles of crosslinked polymer (e.g., see JP Hei 3(1991)-14869B). However, the base coat composition has a defect that it tends to develop film defects such as sagging, non-uniformity and the like under change in coating conditions, in particular, humidity change.

Furthermore, in respect of 2-coat-1-bake coating system, also a coating film-forming method using as the water-based metallic base paint, for example, an aqueous dispersion containing fine polymer particles, in particular, polymer particles copolymerized with specific long chain monomer, e.g., stearyl acrylate, stearyl methacrylate or the like, has been proposed (e.g., see JP 2001-104878A). The method, however, is subject to such problems as insufficient coating operability and finished appearance of the coated film, e.g., smoothness and metallic texture.

DISCLOSURE OF THE INVENTION

The object of the present invention is to provide a thermosetting water-based paint exhibiting excellent coating film performance such as water resistance, which can furthermore form coating film of very favorable finished appearance such as coated surface smoothness and metallic texture, and also to provide coating film-forming methods which use the water-based paint.

We have engaged in concentrative studies to now discover that the above object can be accomplished by concurrent use with a crosslinking agent of a water-dispersible acrylic polymer particles as a resin binder component of thermosetting water-based paint, said polymer particles being obtained by multi-stage emulsion polymerization of radical polymerizable unsaturated monomeric component comprising an amido-containing radical polymerizable unsaturated monomer having at least two radical polymerizable unsaturated groups per molecule, methacrylic acid and a hydroxyl-containing radical polymerizable unsaturated monomer, using a specific reactive emulsifying agent. The present invention is thus completed.

Accordingly therefore, the present invention provides a thermosetting water-based paint comprising water-dispersible acrylic polymer particles (A), crosslinking agent (B) and pigment (C), which is characterized in that the water-dispersible acrylic polymer particles (A) are obtained by multi-stage emulsion polymerization of radical polymerizable unsaturated monomeric component using ammonium salt of sulfonic acid group-containing compound as a reactive emulsifying agent and that the polymer particles have a hydroxyl value within a range of 1-70 mgKOH/g and an acid value within a range of 5-90 mgKOH/g, the radical polymerizable unsaturated monomeric component comprising amido-containing radical polymerizable unsaturated monomer having at least two radical polymerizable unsaturated groups per molecule, methacrylic acid and hydroxyl-containing radical polymerizable unsaturated monomer, and the content of the amido-containing radical polymerizable unsaturated monomer being within a range of 0.1-5% by weight, based on the total radical polymerizable unsaturated monomeric component.

The present invention also provides methods for forming multi-layered coating film using above thermosetting water-based paint.

Use of the thermosetting water-based paint of the present invention enables to form coating film of excellent finished appearance and coating film performance such as water resistance. In particular, the water-based paint of the present invention in the form of water-based metallic base coat paint enables to form coating film of excellent finished appearance such as smoothness and metallic texture.

In consequence, use of the thermosetting water-based paint of the present invention enables to form metallic coat of favorable design with sparkling effect and of excellent coating film performance such as water resistance.

Hereinafter the thermosetting water-based paint and the coating film-forming methods of the present invention are explained in further details.

The thermosetting water-based paint of the present invention (hereinafter may be referred to as "the present paint") is a water-based paint comprising water-dispersible acrylic polymer particles (A), crosslinking agent (B) and pigment (C) which are explained in the following.

Water-Dispersible Acrylic Polymer Particle (A):

The water-dispersible acrylic polymer particles (A) which are contained in the present paint have hydroxyl and carboxyl groups and are prepared by multi-stage emulsion polymerization of a radical polymerizable unsaturated monomeric component comprising an amido-containing radical polymerizable unsaturated monomer having at least two radical polymerizable unsaturated groups per molecule, methacrylic acid and hydroxyl-containing radical polymerizable unsaturated monomer, using a reactive emulsifier.

As the reactive emulsifier, ammonium salt of sulfonic acid compound is used, in consideration of copolymerizability of the radical polymerizable unsaturated monomeric component in the emulsion polymerization for forming the water-dispersible acrylic polymer particles (A), performance such as water resistance of the coating film formed from the present paint and reduction in residual monomer for environmental preservation. As such reactive emulsifier, for example, ammonium salt of sulfonic acid compound having radical polymerizable unsaturated group can be used. More specifically, for example, an anionic emulsifier containing as its basic structure polyoxyethylene alkyl ether sulfuric acid ester salt into which radical polymerizable allyl group is introduced as a part of its hydrophobic groups, can be named.

As suitable commercially available reactive emulsifier, for example, AQUALON™ KH-10 (Dai-ichi Kogyo Seiyaku, Co., Ltd.), LATEMUL™ S-180A (Kao Corporation), SR-1025™ (Asahi Denka Kogyo Co.) and the like can be named.

The reactive emulsifier can be used normally in an amount within a range of 0.1-10 wt %, preferably 0.5-7.5 wt %, inter alia, 1-5 wt %, to the total solid content of the radical polymerizable unsaturated monomeric component for forming the water-dispersible acrylic polymer particles (A).

In the occasion of emulsion polymerization, an emulsifier other than the above reactive emulsifier, for example, anionic surfactant, nonionic surfactant, amphoteric ionic surfactant and the like can be used in addition to the above reactive emulsifier, where necessary. As anionic surfactant, for example, fatty acid, alkyl sulfuric acid ester salt, alkyl benzenesulfonate, alkyl phosphate and the like can be named; as nonionic surfactant, for example, polyoxyethylene alkyl ether, polyoxyethylene alkylallyl ether, polyoxyethylene derivatives, sorbitan fatty acid ester, polyoxyethylene sorbitan fatty acid ester, polyoxyethylene alkylamine, alkylalkanolamide and the like can be named; and as amphoteric ionic surfactant, for example, alkylbetaine and the like can be named.

The above emulsifier, which is concurrently used where necessary, can be used in an amount as combined with the reactive emulsifier of normally 0.1-10 wt %, preferably 0.5-7.5 wt %, inter alia, 1-5 wt %, to the total solid content of the radical polymerizable unsaturated monomeric component for forming the water-dispersible acrylic polymer particles (A).

The water-dispersible acrylic polymer particles (A) are prepared by multi-stage emulsion polymerization of the radical polymerizable unsaturated monomeric component, and may take multi-layered structure such as core/shell two-layered structure, first core/second core/shell three-layered structure or the like. In respect of coating film performance and productivity of water-dispersible acrylic polymer particles (A), those having core/shell two-layered structure are preferred.

The water-dispersible acrylic polymer particles (A) contain as one of the essential monomer components amido-containing radical polymerizable unsaturated monomer having at least two radical polymerizable unsaturated groups per molecule, which induces intra-particle crosslinkage. In the present invention, in particular, the particles of multi-layered structure in which the core portion is crosslinked and the shell portion is non-crosslinked are preferred, from the viewpoint of coating film performance and finished appearance of the coating film.

The water-dispersible acrylic polymer particles (A) can be obtained by multi-stage emulsion polymerization of radical polymerizable unsaturated monomeric component comprising amido-containing radical polymerizable unsaturated monomer having at least two radical polymerizable unsaturated groups per molecule (M-1), methacrylic acid (M-2), hydroxyl-containing radical polymerizable unsaturated monomer (M-3), and optionally other radical polymerizable unsaturated monomer (M-4) where necessary.

The amido-containing radical polymerizable unsaturated monomer having at least 2, preferably 2-3 radical polymerizable unsaturated groups per molecule (M-1) is useful for introducing into the resulting polymer particles amido groups having hydrogen-binding force and for three-dimensionally crosslinking the polymer particles. When the polymer particles formed with use of such unsaturated monomer (M-1) are used for paint, water penetrates to inside of the polymer particles as assisted by the amido groups having hydrogen-binding force, to produce favorable viscosity-developing effect. Furthermore, due to the even distribution of amido groups in the polymer without localization, more favorable coating film performance can be obtained. When amido-containing radical polymerizable unsaturated monomer having only one radical polymerizable unsaturated group per molecule is used, the amido groups tend to be localized in the resulting polymer and a paint showing good coating film performance such as water resistance cannot be obtained.

As such amido-containing radical polymerizable unsaturated monomer having at least 2 radical polymerizable unsaturated groups per molecule (M-1), for example, methylenebis (meth)acrylamide ethylenebis(meth)acrylamide and the like can be named.

Furthermore, where necessary, a minor amount of radical polymerizable unsaturated monomer (M-5) other than the unsaturated monomer (M-1), which has at least 2, preferably 2-3, radical polymerizable unsaturated groups per molecule, may be used in addition to the unsaturated monomer (M-1), as a monomer useful for three-dimensionally crosslinking the polymer particles. As such unsaturated monomer (M-5), for example, ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinylbenzene, trimethylolpropane triacrylate and the like can be named. Here no diene compound is included.

Methacrylic acid (M-2) is a monomer for introducing carboxyl groups into the water-dispersible acrylic polymer particles (A). As a monomeric component for introducing carboxyl groups into a polymer, carboxyl-containing radical polymerizable unsaturated monomer, normally acrylic or methacrylic acid have been often used. Whereas, in the preset invention methacrylic acid is used to make coating film performance consistent to viscosity-developing property. Methacrylic acid has lower degree of dissociation in water compared to acrylic acid, and hence carboxyl groups which are hydrophilic functional groups are more uniformly distributed at the inside of the formed polymer particles, compared to the case of using acrylic acid, to provide a paint capable of forming coating film excelling in water resistance.

Hydroxyl-containing radical polymerizable unsaturated monomer (M-3) is a monomer useful for introducing hydroxyl groups into the water-dispersible acrylic polymer particles (A), as the functional group to react with the crosslinking agent. The monomers include those compounds having at least 1, preferably 1-2 hydroxyl groups and 1 radical polymerizable unsaturated group per molecule. Specific examples of the monomer (M-3) include monoesterified products of acrylic acid or methacrylic acid with $C_2$-$C_{10}$ dihydric alcohols such as 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, 4-hydroxybutyl methacrylate and the like. Furthermore, N-methylolacrylamide, N-methylolmethacrylamide and the like may be also used. These hydroxyl-containing radical polymerizable unsaturated monomers (M-3) can be used each singly or in combination of two or more.

Other radical polymerizable unsaturated monomers (M-4) which are used where necessary are those other than the above monomers (M-1), (M-2) and (M-3) and include compounds having 1 radical polymerizable unsaturated group per molecule, specific examples being listed in the following (1)-(7):

(1) monoesterification products of acrylic acid or methacrylic acid with $C_1$-$C_{20}$ monohydric alcohols; for example, methyl acrylate, methyl methacrylate, ethyl acrylate, ethyl methacrylate, n-propyl acrylate, i-propyl acrylate, n-propyl methacrylate, i-propyl methacrylate, n-butyl acrylate, i-butyl acrylate, t-butyl acrylate, n-butyl methacrylate, i-butyl methacrylate, t-butyl methacrylate, 2-ethylhexyl acrylate, 2-ethylhexyl methacrylate, cyclohexyl acrylate, cyclohexyl methacrylate, lauryl acrylate, lauryl methacrylate and the like (2) aromatic vinyl monomers; for example, styrene, α-methylstyrene, vinyltoluene and the like (3) glycidyl-containing vinyl monomers; compounds containing one each of glycidyl group and polymerizable unsaturated bond per molecule, specific examples including glycidyl acrylate, glycidyl methacrylate and the like (4) nitrogen-containing alkyl ($C_1$-$C_{20}$) acrylate; for example, dimethylaminoethyl acrylate, dimethylaminoethyl methacrylate and the like (5) vinyl compounds; for example, vinyl acetate, vinyl propionate, vinyl chloride and the like (6) polymerizable unsaturated bond-containing nitrile compounds; for example, acrylonitrile, methacrylonitrile and the like (7) diene compounds; for example, butadiene, isoprene and the like.

These other radical polymerizable unsaturated monomers (M-4) can be used either singly or in combination of two or more.

While ratio of above-described radical polymerizable unsaturated monomers in the preparation of water-dispersible acrylic polymer particles (A) is variable over a broad range according to the characteristic properties desired for the polymer particles or intended utility of the paint containing them, in general terms the amido-containing radical polymerizable unsaturated monomer (M-1) having at least 2 radical polymerizable unsaturated groups per molecule can be used within a range of 0.1-5 wt %, preferably 0.3-4.5 wt %, inter alia, 0.5-4 wt %; methacrylic acid (M-2), within a range of 0.1-20 wt %, preferably 0.5-15 wt %, inter alia, 1-10 wt %; and the hydroxyl-containing radical polymerizable unsaturated monomer (M-3), within a range of 0.1-20 wt %, preferably 0.5-17.5 wt %, inter alia, 1-15 wt %, base on the total amount of the radical polymerizable unsaturated monomeric component. Other radical polymerizable unsaturated monomer (M-4), which is used where necessary, is used in the balancing amount.

Where the use ratio of the amido-containing radical polymerizable unsaturated monomer (M-1) having at least two radical polymerizable unsaturated groups per molecule is less than 0.1 wt %, the resulting water-dispersible acrylic polymer particles (A) exhibit insufficient viscosity-developing effect which leads to inferior finished appearance of coating film. Conversely, when it exceeds 5 wt %, the water-dispersible acrylic polymer particles (A) tend to have reduced storage stability. Where the use ratio of methacrylic acid (M-2) is less than 0.1 wt %, viscosity-developing effect of the water-dispersible acrylic polymer particles (A) becomes insufficient to lead to inferior finished appearance of the coating film. Conversely, when it exceeds 20 wt %, the coating film tends to show reduced water resistance. Where the use ratio of hydroxyl-containing radical polymerizable unsaturated monomer (M-3) is less than 0.1 wt %, hardenability of the coating film becomes insufficient, and where it exceeds 20 wt %, the coating film tends to show reduced water resistance.

Where a core/shell type two-layer-structure water-dispersible acrylic polymer particles (A) are to be prepared, the core/shell distribution of the radical polymerizable unsaturated monomeric component can be, in terms of weight ratio, generally 95/5-50/50, preferably 85/15-60/40, inter alia, 80/20-65/35, based on the total amount of the radical polymerizable unsaturated monomeric component. Where the weight of the core is less than 50 wt parts to the total amount of the radical polymerizable unsaturated monomers used, the coating film tends to have reduced water resistance. Whereas, where the weight of the core exceeds 90 wt parts to the total amount of the radical polymerizable unsaturated monomers used, the water-dispersible acrylic polymer particles (A) tend to show insufficient viscosity-developing effect to deteriorate the finished appearance of coating film.

Emulsion polymerization of the radical polymerizable unsaturated monomeric component can be conducted in the presence of a radical polymerization initiator. Examples of useful radical polymerization initiator include peroxides represented by ammonium persulfate, potassium persulfate, ammonium peroxide and the like; combinations of these peroxides with reducing agent such as sodium hydrogensulfite, sodium thiosulfate, Rongalit, ascorbic acid and the like, which are referred to as redox initiator; and azo compounds such as 4,4'-azobis(4-cyanobutanoic acid) and the like. Suitable use rate of such radical polymerization initiator is normally 0.01-10 wt %, preferably 0.1-5 wt %, based on the total solid content of the radical polymerizable unsaturated monomeric component for making the water-dispersible acrylic polymer particles (A).

Suitable concentration of the total radical polymerizable unsaturated monomeric component in the emulsion polymerization system normally ranges 0.1-60 wt %, preferably 0.5-50 wt %.

The reaction temperature of the emulsion polymerization differs depending on the kind of radical polymerization initiator used, while normally preferred range is 60-90° C., and the reaction time can normally range about 5-10 hours.

Multi-stage emulsion polymerization of radical polymerizable unsaturated monomeric component can be conducted, more specifically, by emulsion polymerizing the radical polymerizable unsaturated monomeric component which contains amido-containing radical polymerizable unsaturated monomer (M-1) but no or little methacrylic acid (M-2) in the first stage, adding in the second stage the radical polymerizable unsaturated monomeric component which may or may not contain unsaturated monomer (M-1) and contains a large amount of methacrylic acid (M-2) and further continuing the emulsion polymerization. Thus core/shell structured water-dispersible acrylic polymer particles (A) are obtained. By further repeating the first stage and/or second stage operations, water-dispersible acrylic polymer particles (A) consisting of still increased number of layers can be obtained.

Use rate of methacrylic acid (M-2) in the above multi-stage emulsion polymerization is: in the first stage synthesis of the core, normally within a range of 0-10 wt %, preferably 0-7.5 wt %, inter alia, 0-5 wt %, based on the total amount of the radical polymerizable unsaturated monomeric component used for forming the core; and in the second stage for synthesizing the shell, normally within a range of 5-30 wt %, preferably 7.5-27.5 wt %, inter alia, 10-25 wt %, based on the total amount of the radical polymerizable unsaturated monomeric component used for forming the shell.

Thus obtained water-dispersible acrylic polymer particles (A) generally have a hydroxyl value within a range of 1-70 mgKOH/g, preferably 2-60 mgKOH/g, inter alia, 5-50 mgKOH/g, from the viewpoint of water resistance and curability of ultimately formed coating film formed of the present paint. Also the water-dispersible acrylic polymer particles (A) generally have an acid value within a range of 5-90 mgKOH/g, preferably 10-70 mgKOH/g, inter alia, 15-50 mgKOH/g, for favorable storage stability and water resistance of coating film of the resulting paint. Furthermore the water-dispersible acrylic polymer particles (A) can have an average particle size generally ranging from 10-1,000 nm, preferably 15-750 nm, inter alia, 20-500 nm.

The water-dispersible, acrylic polymer particles (A) are preferably neutralized with basic compound in the occasion of preparing the present paint. As neutralizing agent for the particles (A), for example ammonia or water-soluble amino compounds, such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine, morpholine and the like can be conveniently used.

Crosslinking Agent (B)

Crosslinking agent (B) useful for the present paint is subject to no particular limitation, and those customarily used in the art of paint can be similarly used. For example, the following blocked polyisocyanate hardening agent (b-1), water-dispersible blocked polyisocyanate hardening agent (b-2), melamine resin (b-3) and the like can be conveniently used.

Blocked polyisocyanate hardening agent (b-1) is a polyisocyanate compound containing at least two free isocyanate groups per molecule, whose isocyanate groups being blocked with a blocking agent.

As the polyisocyanate compound, for example, aliphatic polyisocyanates such as hexamethylene diisocyanate, trimethylhexamethylene diisocyanate, dimeric acid diisocyanate, lysine diisocyanate and the like, biuret type adducts of these polyisocyanates or their isocyanurate ring adducts; alicyclic diisocyanates such as isophorone diisocyanate, 4,4'-methylenebis(cyclohexylisocyanate), methylcyclohexane-2,4- or 2,6-diisocyanate, 1,3- or 1,4-di(isocyanatomethyl) cyclohexane, 1,4-cyclohexane diisocyanate, 1,3-cyclopentane diisocyanate, 1,2-cyclohexane diisocyanate and the like, and biuret-type adducts or isocyanurate ring adducts of these alicyclic diisocyanates; aromatic diisocyanate compounds such as xylylene diisocyanate, tetramethylxylylene diisocyanate, tolylene diisocyanate, 4,4'-diphenylmethane diisocyanate (MDI), 1,5-naphthalene diisocyanate, 1,4-naphthalene diisocyanate, 4,4'-toluidine diisocyanate, 4,4'-diphenylether diisocyanate, m- or p-phenylene diisocyanate, 4,4'-biphenylene diisocyanate, 3,3'-dimethyl-4,4'-biphenylene diisocyanate, bis(4-isocyanatophenyl)sulfone, isopropylidenebis(4-phenyl isocyanate) and the like, and biuret type adducts and isocyanurate ring adducts of these polyisocyanates; hydrogenated MDI and derivatives thereof; polyisocyanates having at least three isocyanate groups per molecule such as triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate and the like, and biuret type adducts or isocyanurate ring adducts of these polyisocyanates; and urethanated adducts formed by reacting such polyols as ethylene glycol, propylene glycol, 1,4-butylene glycol, dimethylolpropionic acid, polyalkylene glycol, trimethylolpropane, hexanetriol and the like with polyisocyanate compound at such ratios that the isocyanate groups become excessive to the hydroxyl groups of the polyol, and biuret type adducts or isocyanurate ring adducts of these urethanated adducts; and the like can be named.

Those blocking agents are used for temporarily blocking the free isocyanate groups in these polyisocyanate compounds. Whereby blocked isocyanate groups can be regenerated as free isocyanate groups when the blocking agent is dissociated under heating to, for example, at least 100° C., preferably 130° C. or higher, and can readily crosslink with hydroxyl groups. As such blocking agent, for example, phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formamidoxime, acetamidoxime, acetoxime, methyl ethyl ketoxime, diacetylmonooxime, benzophenone-oxime, cyclohexane-oxime and the like; malonic acid dialkyl esters such as dimethyl malonate, diethyl malonate, diisopropyl malonate, di-n-butyl malonate, diethyl methylmalonate, benzyl methylmalonate, diphenyl malonate and the like; acetoacetic acid esters such as methyl acetoacetate, ethyl acetoacetate, isopropyl acetoacetate, n-propyl acetoacetate, benzyl acetoacetate, phenyl acetoacetate and the like; active methylene such as acetylacetone; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetoanisidide, acetotoluide, acrylamide, methacrylamide, acetic amide, stearic amide, benzamide and the like; imides such as succinimide, phthalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethyl-imidazole and the like; pyrazoles such as 3,5-dimethylpyrazole; ureas such as urea, thiourea, ethyleneurea, ethylenethiourea, diphenylurea and the like; carbamic acid esters such as phenyl N-phenylcarbamate; imines such as ethyleneimine, propyleneimine and the like; and sulfites such as sodium disulfite, potassium disulfite and the like can be named.

For reducing organic solvent content (low VOC content) of the paint, it is recommendable to reduce organic solvent content of also those crosslinking agents (B), and for this purpose water-dispersibility-imparted blocked polyisocyanate hardening agent (b-2) which is formed by imparting water dispersibility to blocked polyisocyanate hardening agent (b-1) can be used within an extent not degrading coating film performance.

As the water-dispersibility-imparted blocked polyisocyanate hardening agent (b-2), for example, blocked polyisocyanate compound to which water dispersibility is imparted through the steps of blocking isocyanate groups of a polyisocyanate compound with a blocking agent containing hydroxymonocarboxylic acid and neutralizing the carboxyl groups introduced by the hydroxymonocarboxylic acid can be named. In that case, it is preferred to so carry out the reaction that at least one isocyanate group of the polyisocyanate compound adds to hydroxyl group of the hydroxymonocarboxylic acid, from the viewpoint of favorable water dispersibility of the resulting blocked polyisocyanate hardening agent.

As the polyisocyanate compound, those similar to the above-exemplified polyisocyanate compounds as for the blocked polyisocyanate hardening agent (b-1) can be used. In particular, hexamethylene diisocyanate (HMDI), hexamethylene diisocyanate (HMDI) derivatives, isophorone diisocyanate (IPDI), isophorone diisocyanate (IPDI) derivatives, hydrogenated MDI and hydrogenated MDI derivatives are preferred.

As the blocking agent, those similar to the exemplified blocking agents as for preparation of the blocked polyisocyanate hardening agent (b-1) can be used. As the hydroxymonocarboxylic acid, for example, 2-hydroxyacetic acid, 3-hydroxypropanoic acid, 12-hydroxy-9-octadecanoic acid (ricinoleic acid), 3-hydroxy-2,2-dimethylpropanoic acid (hydroxypivalic acid), 2,2-dimethylolpropionic acid (DMPA) and the like can be named. Of these, 3-hydroxy-2,2-dimethylpropanoic acid (hydroxypivalic acid) is particularly preferred. The reaction can be conducted in a solvent which is non-reactive with isocyanate groups, for example, ketones such as acetone, methyl ethyl ketone and the like; esters such as ethyl acetate; and N-methylpyrrolidone (NMP).

As melamine resin (b-3), specifically, di-, tri-, tetra-, penta- or hexa-methylolmelamines and alkyl etherified products thereof (examples of alkyl being methyl, ethyl, propyl, isopropyl, butyl, isobutyl, 2-ethylhexyl and the like) and their condensates can be named. As commercially available product, for example, Cymel™ series such as Cymel™ 254 (Nippon Cytec Industries Co.) and U-Van™ series such as U-Van™ 20SB (Mitsui Chemicals) can be used.

Again, when the melamine resin (b-3) is used as a hardening agent, sulfonic acid such as paratoluenesulfonic acid, dodecylbenzenesulfonic acid, dinonylnaphthalenesulfonic acid, or salts of these acids with amine can be used as the catalyst.

Pigment (C)

As pigment (C) useful for the present paint, for example, coloring pigments such as titanium dioxide, zinc flower, carbon black, cadimium red, molybdenum red, Chrome Yellow, chromium oxide, Prussian Blue, cobalt blue, azo pigment, phthalocyanine pigment, quinacridone pigment, isoindoline pigment, threne pigment, perylene pigment and the like; extenders such as talc, clay, kaoline, baryta, barium sulfate, barium carbonate, calcium carbonate, silica, alumina white and the like; effect pigments such as aluminum powder, mica powder, titanium oxide-covered mica powder and the like can be named, which can be used each singly or in combination of two or more.

Pigment can be normally blended in the present paint by first preparing a pigment-dispersed paste using a part of resin used for the present paint, and adding the same to the remaining aqueous varnish concurrently with other components. In the occasion of preparing such a pigment-dispersed paste, suitably customary paint additives such as defoaming agent, dispersing agent, surface regulating agent and the like may be added where necessary.

When the present paint is used as metallic finish waterborn base coat paint, effect pigment can be added as the pigment, and where necessary, coloring pigment may also be used.

Thermosetting Water-Based Paint:

Thermosetting water-based paint according to the present invention can be prepared, for example, by dispersing the water-dispersible acrylic polymer particles (A) in an aqueous medium containing basic compound for neutralization, and to the dispersion adding crosslinking agent (B) and pigment (C) in the form of above-described pigment paste and dispersing them. In that occasion, the basic compound for neutralization can be normally used in an amount as will render pH of the thermosetting water based paint 7-9.

Respective contents of the water dispersible acrylic polymer particles (A), crosslinking agent (B) and pigment (C) of the present paint are not subject to strict limitation, but are variable over a wide range according to the intended utility of the present paint. In general terms, based on the weight of solid resin content in the thermosetting water-based paint [sum of water-dispersible acrylic polymer particles (A) and crosslinking agent (B), which applies to the hereafter appearing solid resin content], water-dispersible acrylic polymer particles (A), as solid content, may be within a range of 5-80 wt %, preferably 7.5-70 wt %, inter alia, 10-60 wt %; and the crosslinking agent may be present within a range of 5-80 wt %, preferably 7.5-70 wt %, inter alia, 10-60 wt %. The pigment (C) may be present within a range of normally 1-250 wt parts, preferably 20-200 wt parts, inter alia, 3-150 wt parts, per 100 wt parts of solid resin content of the thermosetting water-based paint.

The present paint may contain, in addition to above-described water-dispersible acrylic polymer particles (A) and crosslinking agent (B), still other resin component, where necessary. As such resin component, for example, acrylic resin, polyester resin, urethanated polyester resin, epoxy resin and the like can be used. Of those, acrylic resin and polyester resin as hereinafter described are preferred.

Acrylic Resin

The acrylic resin which may be contained in the present paint where necessary is subject to no particular limitation and, for example, those synthesized through (co)polymerization in accepted manner of radical polymerizable acrylic monomer(s) can be used. As the polymerization method, solution polymerization is convenient. As the organic solvent useful for the solution polymerization, for example, hydrophilic organic solvents such as propylene glycol-type and dipropylene glycol type are preferred. Also from the standpoint of dispersibility in water, acrylic resins having acid groups such as carboxyl are preferred.

As radical polymerizable acrylic monomers, those heretofore known, such as, for example, hydroxyl-containing radical polymerizable unsaturated monomers, carboxyl-containing radical polymerizable unsaturated monomers and other radical polymerizable unsaturated monomers can be used.

As examples of hydroxyl-containing radical polymerizable unsaturated monomer, 2-hydroxyethyl (meth)acrylate, hydroxylpropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate and the like can be named.

As examples of carboxyl-containing radical polymerizable unsaturated monomers, acrylic acid, methacrylic acid and the like can be named.

As examples of other radical polymerizable unsaturated monomer, styrene, methyl (meth)acrylate, ethyl (meth)acrylate, n-butyl (meth)acrylate, i-butyl (meth)acrylate, t-butyl (meth)acrylate, 2-ethylhexyl (meth)acrylate, lauryl (meth)acrylate, cyclohexyl (meth)acrylate, cyclohexenyl (meth)acrylate, phenoxyethyl (meth)acrylate, phenoxypolyethylene glycol (meth)acrylate, dicyclopentenyl (meth)acrylate, dicyclopentenyloxyethyl (meth)acrylate, isobornyl (meth)acrylate, benzyl (meth)acrylate, ARONIX™ M110 (Toa Gosei), N-methylol (meth)acrylamide, N-butoxy (meth)acrylamide, acryloyl morpholine, dimethylaminoethyl (meth)acrylate, N-vinyl-2-pyrrolidone, γ-acryloxypropyltrimethoxysilane and the like can be named.

In the above, "(meth)acrylate" means "acrylate or methacrylate".

It is generally convenient that the acrylic resin has weight-average molecular weight in the range of 1,000-200,000, preferably 2,000-100,000. The acrylic resin furthermore can generally have hydroxyl value within a range of 10-250 mgKOH/g, preferably 30-150 mgKOH/g and acid value generally within a range of 10-100 mgKOH/g, preferably 20-60 mgKOH/g.

In the present specification, weight-average molecular weight is a value obtained by converting individual weight-average molecular weight as measured by gel permeation chromatograph ("HLC8120GPC", Tosoh Corporation) based on the weight-average molecular weight of polystyrene. The measurement was conducted with use of four columns of "TSKgel G-4000 H×L", "TSKgel G-3000 H×L", "TSKgel G-2500 H×L" and "TSKgel G-2000 H×L" (trademarks, Tosoh Corporation) under the conditions of: mobile phase, tetrahydrofuran; measuring temperature, 40° C.; flow rate, 1 cc/min; and detector, RI.

Blend ratio of the acrylic resin can be, in terms of solid content based on the weight of solid resin content of thermosetting water based paint, 0-40 wt %, preferably 5-35 wt %.

Polyester Resin

As polyester resins which may be contained in the present paint are not subject to any particular limitation and, for example, polyester resins synthesized by esterification of polybasic acid and polyhydric alcohol according to known methods can be used.

Polybasic acid is a compound having at least two carboxyl groups per molecule, examples of which include phthalic acid, isophthalic acid, terephthalic acid, succinic acid, adipic acid, azelaic acid, sebacic acid, tetrahydrophthalic acid, hexahydrophthalic acid, HET acid, maleic acid, fumaric acid, itaconic acid, trimellitic acid, and anhydrides of those acids. Polyhydric alcohol is a compound having at least two hydroxyl groups per molecule, examples of which include ethylene glycol, propylene glycol, butylene glycol, hexanediol, diethylene glycol, dipropylene glycol, neopentyl glycol, triethylene glycol, glycerine, trimethylolethane, trimethylolpropane, pentaerythritol and the like.

As the polyester resin, fatty acid-modified polyester resins which are modified with (semi)dry oil fatty acid such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid and the like can also be used. Generally preferred extent of modification with these fatty acids is not more than 30 wt % in terms of oil length. It is also permissible to use those which are partially reacted with monobasic acid such as benzoic acid. Furthermore, for the purpose of introducing acid groups into the polyester resin, those esterification products of aforesaid polybasic acid with polyhydric alcohol can be further reacted with such a polybasic acid or anhydride thereof as trimellitic acid, trimellitic anhydride or the like.

Generally the polyester resin preferably has weight-average molecular weight within a range of 1,000-200,000, in particular, 2,000-50,000. The polyester resin can also generally have hydroxyl value within a range of 10-250 mgKOH/g, preferably 30-150 mgKOH/g and acid value within a range of 10-100 mgKOH/g, preferably 20-60 mgKOH/g.

The blend ratio of the polyester resin can be, in terms of solid content based on the weight of solid resin component in the thermosetting water-based paint, within a range of 0-40 wt %, preferably 5-35 wt %.

Where necessary, the present paint may contain, in addition to the water-dispersible acrylic polymer particles (A), other resin particles, for example, water-dispersible urethane polymer particles which are described hereinafter.

Water-Dispersible Urethane Polymer Particles

Water-dispersible urethane polymer particles are normally used in the art of paint for improving physical properties of coating film, for example, stress-alleviating effect. Where the present paint is used for automobiles, for example, blending of the water-dispersible urethane polymer particles achieves such effects as improving resistance of the coating to damages incurred by stones bumped off by running cars (chipping resistance), adherability and the like.

Water-dispersible urethane polymer particles can be obtained, for example, by dispersing or dissolving in water a urethane polymer which is obtained upon reacting an active hydrogen-containing compound, a compound having in its molecule active hydrogen and anionic group or anion-forming group, and an organic polyisocyanate compound.

As the active hydrogen-containing compound, for example, high molecular polyol, low molecular polyol and polyamine (e.g., those disclosed in JP Hei 3 (1991)-9951A) can be named.

As high molecular polyols, polyether polyol, polyester polyol or polycarbonate polyol are preferred. The high molecular polyols can normally have an OH equivalent value within a range of 200-3,000, preferably 250-2,000. As low molecular polyols, 1,4-butanediol, 3-methylpentanediol, pentaerythritol and trimethylolpropane are preferred. Also as polyamines, hexamethylenediamine, isophoronediamine, N-hydroxyethylethylenediamine and 4,4'-diaminodicyclohexylmethane are preferred.

As the compounds having in their molecules active hydrogen and anionic group or anion-forming group, for example, dihydorxycarboxylic acid (e.g., α,α'-dimethylolpropionic acid, α,α-dimethylolbutyric acid and the like), dihydroxysulfonic acid compound [e.g, 3-(2,3-dihydroxypropoxy)-1-propanesulfonic acid sodium salt and the like] and diaminocarboxylic acid (e.g., diaminobenzoic acid and the like) can be named, and as the basic compounds for neutralizing these compounds, for example, organic base (e.g., triethylamine, trimethylamine and the like) and inorganic base (e.g., sodium hydroxide, potassium hydroxide and the like) can be named.

As organic polyisocyanate compounds, for example, isophorone diisocyanate (IPDI), hexamethylene diisocyanate (HMDI) 4,4'-dicyclohexylmethane diisocyanate (hydrogeneated MDI), 2,4- or 2,6-tolylene diisocyanate (TDI), 4,4'-diphenylmethane diisocyanate (MDI), α,α,α',α'-tetramethylxylylene diisocyanate (TMXDI) and the like can be named.

The urethane polymer can be prepared by such methods as one-shot method in which all three components of an active hydrogen-containing compound, a compound having in the molecule active hydrogen and anionic group or anion-forming group and an organic polyisocyanate compound are reacted at one time; or multi-stage method in which, for example, first a part of an active hydrogen-containing compound (e.g., high molecular polyol) is reacted with a compound containing in its molecule active hydrogen and anionic group or anion-forming group and an organic polyisocyanate compound to form a prepolymer with isocyanate termini, and thereafter the prepolymer is reacted with the rest of the active hydrogen-containing compound.

The above reactions can be normally conducted at a temperature range of 40-140° C., preferably 60-120° C. The reactions can be conducted in an organic solvent inert to isocyanate, for example, acetone, toluene, dimethylformamide and the like. The organic solvent can be added either halfway the reaction or after the reaction.

The water-dispersible urethane polymer particles can be obtained by neutralizing the urethane polymer having hydrophilic groups, which is obtained as above, with a basic compound to form anionic groups, and thereafter dispersing or dissolving the polymer in water.

In the occasion of dispersing or dissolving the urethane polymer in water, furthermore, anionic and/or nonionic surfactant may be concurrently used, where necessary.

The blend ratio of the water-dispersible urethane polymer particles can be, in terms of solid based on the weight of solid resin components in the thermosetting water-based paint, within a range of 0-40 wt %, preferably 5-35 wt %.

The present paint can further contain still other customary paint additives where necessary, such as hardening catalyst, UV absorber, photo stabilizer, surface-regulating agent, degradation-preventing agent, antisagging agent, sedimentation-preventing agent and the like.

As hardening catalyst, for example, organometal compound, acid compound and base compound can be used.

As the organometal compounds, for example, metallic catalysts such as tetraisopropyl titanate, tetrabutyl titanate, lithium acetate, iron (III) acetylacetonate, zinc 2-ethylhexanoate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistanoxane, tetra-n-propyl-1,3-diacetyloxydistanoxane, tetra-n-butyl-1,3-dilauryloxydistanoxane and the like can be named. In particular, organotin compounds such as tin octylate, dibutyltin diacetate, dibutyltin dilaurate, distanoxanes and the like are preferred. Furthermore, where low temperature baking is required, dibutyltin diacetate can be favorably used.

As the acid compound, for example paratoluenesulfonic acid, dodecylbenzenesulfonic acid, dinonylnaphthalenesulfonic acid, dinonylnaphthalenedisulfonic acid, butylphosphoric acid, octylphosphoric acid and the like can be named. Amine-neutralized products of these acids can also be conveniently used.

As the base compound, for example, trimethylamine triethylamine, dimethylcyclohexylamine, N-tetramethylhexane-1,6-diamine, N-pentamethyldiethylenetriamine, 2-methyl-1,4-diazabicyclo[2,2,2]octane and the like can be used.

These compounds which are named above as the hardening catalyst can be used either singly or in combination of two or more. Use rate of hardening catalyst varies depending on the kind of the catalyst, while normally suitable range is about 0.05-5 wt parts, per 100 wt parts of the total solid resin components in the present paint.

As UV absorber, those known per se, for example, benzotriazole absorbers, triazine absorbers, salycilic acid derivative absorbers, benzophenone absorbers and the like can be used. Where a UV absorber is to be contained, its content in the present paint can normally range 0.1-10 wt parts, in particular, 0.2-5 wt parts, inter alia, 0.3-2 wt parts, per 100 wt parts of the total solid resin components, for favorable weatherability and yellowing resistance.

As the photo-stabilizer, those known per se, for example, hindered amine photo-stabilizers, can be used. Where a photo-stabilizer is used, its content in the present paint may normally range 0.1-10 wt parts, in particular, 0.2-5 wt parts, inter alia, 0.3-2 wt parts, per 100 wt parts of the total solid resin components for favorable weatherability and yellowing resistance.

Multi-Layered Coating Film-Forming Method:

The present paint can give coating film of excellent performance such as finished appearance, water resistance and the like, when applied on object articles. While the articles to which the paint is applicable are not subject to any particular limitation, for example, bodies of various vehicles such as automobiles, two-wheelers, container cars and the like are preferred. The articles may also be steel sheet such as cold-rolled steel sheet, zinc-plated steel sheet, zinc alloy-plated steel sheet, stainless steel sheet, tin-plated steel sheet and the like; metallic substrates such as aluminum sheet, aluminum alloy sheet and the like; and various plastic sheets, which constitute these car bodies.

The articles to be coated may be these car bodies or metallic substrates with their metallic surfaces having been given a surface treatment such as phosphate treatment, chromate treatment, compound oxide treatment or the like. Furthermore, such surface-treated car bodies and metallic substrates may have been applied with undercoat and/or intermediate coat of various electrodeposition paint and the like, where necessary.

Methods for applying the present paint are not subject to any particular limitation, and any of air spray coating, airless spray coating, rotary atomizing coating, curtain coating methods and the like can be used to form wet coating film. These coating methods may be conducted under electrostatic application, where necessary. Of these, air spray coating method is particularly convenient. Normally preferred application rate of the thermosetting, water-based paint ranges from about 10 to about 70 μm, in particular, from about 15 to about 60 μm, in terms of the hardened film thickness.

In the occasions of air spray coating, airless spray coating or rotary atomizing coating, preferably the viscosity of the present paint is adjusted in advance with organic solvent and/or water, to fall within a viscosity range suitable for the coating, normally about 15-60 seconds at 20° C. as measured with Ford Cup #4 viscosimeter.

Hardening of wet coating film is effected by heating after the paint is applied onto an object article. The heating can be conducted by a heating means known per se, such as drying oven, e.g., hot air-current oven, electric oven, infrared induction heating oven and the like. Suitable heating temperature is normally within a range of 80-180° C., in particular, 100-160° C. The heating time is not particularly limited, but normally it can be within a range of about 20-40 minutes.

The present paint can be conveniently used as paint for cars, in particular, as base coat paint for top coating.

When used as base coat paint for top coating, for example, the present paint is applied onto an object article which has been applied with electrodeposition coat and/or intermediate coat, and onto the unhardened base coat film a clear coat paint is applied without an intervening hardening of the film. Upon subsequent simultaneous hardening of the base coat and clear coat by heating, a multi-layered coating film can be formed by the 2-coat-1-bake system.

Multi-layered coating film can also be formed by 3-coat-1-bake system which comprises applying an intermediate paint on an object article, applying onto the unhardened intermediate coat film the present paint as a base coat for top coating, further applying onto the unhardened base coat film a clear coat paint without an intervening hardening, and thereafter heating the three-layered coating film formed of the intermediate coat, base coat for top coating and the clear coat to simultaneously harden the same.

As the intermediate paint used in the above, heretofore known thermosetting intermediate paint can be used. More specifically, paint formed of such main resin as alkyd resin, polyester resin, acrylic resin, urethane resin and the like, in suitable combination with hardening agent reactive with reactive functional groups contained in the main resin, such as amino resin, polyisocyanate compound, blocked polyisocyanate compound and the like can be used. As the polyisocyanate compound and blocked polyisocyanate compound, for example, those earlier exemplified as to the crosslinking agent (B) can be used. As the intermediate paint, high solid paint, waterborn paint, powder paint and the like having low organic solvent content can be conveniently used, in consideration of avoiding environmental pollution and for resource saving.

As the clear coat paint useful in the above, thermosetting clear coat paints known per se can be used. More specifically, organic solvent-diluted paint compositions in which main resins such as alkyd resin, polyester resin, acrylic resin, silicone resin, fluorinated resin, urethane resin and the like are combined with hardening agents such as amino resin, polyisocyanate compound, blocked polyisocyanate compound, polycarboxylic acid or anhydride thereof, reactive silane compound and the like which are reactive with the reactive functional groups contained in the main resins can be used. As the polyisocyanate compound and blocked polyisocyanate compound, for example, those earlier-named in respect of the crosslinking agent (B) can be used. High solid paint, water-based paint or powder paint using less amount of organic solvent can also be used as the clear coat paint, for avoiding environmental pollution and for resource saving.

In particular, clear coat paint of acrylic resin/melamine resin, acrylic resin/polyisocyanate hardening agent, or acrylic resin/blocked polyisocyanate hardening agent or acid group-containing resin/epoxy group-containing resin system can be advantageous used.

EXAMPLES

Hereinafter the invention is explained more specifically, referring to Working Examples and Comparative Examples, it being understood that the invention is in no way restricted to these Working Examples only. In the following, parts and percentages are by weight, and the coating film thickness is that of hardened coating film.

Production of Water-Dispersible Acrylic Polymer Particles (A)

Production Example 1

A reactor equipped with a thermometer, thermostat, stirrer, reflux condenser and a dropping device was charged with 100 parts of deionized water and 0.5 part of AQUALON™ KH-10 (note 1) which were mixed by stirring in nitrogen current, and the temperature was raised to 80° C. Then 1% of the total amount of the monomeric emulsion 1 specified in the following and 10.3 parts of 3% aqueous ammonium persulfate solution were introduced into the reactor and maintained at 80° C. for 15 minutes. Thereafter the remainder of the monomeric emulsion 1 was dropped into the reaction over a period of 3 hours, followed by an hour's aging after the dropwise addition was completed. Then the following monomeric emulsion 2 was dropwisely added over a period of 2 hours, again followed by an hour's aging. The reaction mixture was cooled to 30° C. under gradual addition of 42 parts of 5.0% aqueous dimethylethanolamine solution into the reactor. Thereafter the reaction mixture was discharged from the reactor while being filtered through a 100-mesh Nylon cloth, to provide water-dispersible acrylic polymer particles 1 (solid content, 30 wt %) having an average particle size of 100 nm [as measured with a submicron particle size distribution measuring device, "COULTER™ N4 Model" (Beckman Coulter Co.), as to deionized water-diluted emulsion at 20° C.], an acid value of 32 mgKOH/g and hydroxyl value of 43 mgKOH/g.

note 1) AQUALON™ KH-10: polyoxyethylene alkyl ether sulfate ester ammonium salt: Dai-ichi Kogyo Seiyaku Co. Ltd.; active component, 97%)

Monomeric emulsion 1: Monomeric emulsion 1 was prepared by mixing and stirring 60 parts of deionized water, 1 part of AQUALON™ KH-10, 3 parts of methylenebisacrylamide, 4 parts of styrene, 13 parts of methyl methacrylate, 30 parts of ethyl acrylate and 20 parts of n-butyl acrylate.

Monomeric emulsion 2: Monomeric emulsion 2 was prepared by mixing and stirring 20 parts of deionized water, 1 part of AQUALON™ KH-10, 0.1 part of ammonium persulfate, 3 parts of styrene, 6 parts of methyl methacrylate, 2 parts of ethyl acrylate, 4 parts of n-butyl acrylate, 10 parts of hydroxyethyl acrylate and 5 parts of methacrylic acid.

Production Examples 2-8

Water-dispersible acrylic polymer particles 2-8 were obtained using the starting materials of the amounts as shown in the following Table 1, through the operations similar to those of Production Example 1. The solid concentration by weight, acid value and hydroxyl value of each of the resultant water-dispersible acrylic polymer particles 2-8 are also shown in Table 1, concurrently with those of the water-dispersible acrylic polymer particles 1 as obtained in Production Example 1.

TABLE 1

|  | Production Example | | | | | | | |
| --- | --- | --- | --- | --- | --- | --- | --- | --- |
|  | 1 | 2 | 3 | 4 | 5 | 6 | 7 | 8 |
| Water-dispersible acrylic polymer particles | 1 | 2 | 3 | 4 | 5 | 6 | 7 | 8 |
| Deionized water |  |  |  |  | 100 |  |  |  |
| AQUALON ™ KH-10 (note 1) |  |  |  |  | 0.5 |  |  | 0.5 |

TABLE 1-continued

|  |  | Production Example | | | | | | | |
|---|---|---|---|---|---|---|---|---|---|
|  |  | 1 | 2 | 3 | 4 | 5 | 6 | 7 | 8 |
| Newcol™ 562SN (note 2) |  |  |  |  |  |  |  | 2 |  |
| Deionized water |  |  |  |  | 10 |  |  |  |  |
| Ammonium persulfate |  |  | 0.3 |  |  | 0.4 |  | 0.3 |  |
| Monomeric Emulsion 1 | Deionized water | 60 | 70 | 60 | 60 | 80 |  | 60 |  |
|  | AQUALON™ KH-10 (note 1) |  | 1 |  |  | 2 | 1 |  | 1 |
|  | Newcol™ 562SN (note 2) |  |  |  |  |  |  | 4 |  |
|  | Methylenebisacrylamide | 3 | 3 |  |  | 2 | 1 | 3 | 1 |
|  | 1,6-Hexanediol diacrylate |  |  | 2 |  |  |  |  |  |
|  | Acrylamide |  |  | 1 | 3 |  |  |  |  |
|  | Methacrylic acid |  | 2 |  |  | 8 |  |  |  |
|  | Hydroxyethyl acrylate |  | 5 |  |  | 5 |  |  |  |
|  | Styrene | 4 | 4 | 5 | 10 | 10 | 10 | 4 | 10 |
|  | Methyl methacrylate | 13 | 12 | 15 | 20 | 30 | 19 | 13 | 19 |
|  | Ethyl acrylate | 30 | 34 | 10 |  | 10 |  | 10 |  |
|  | n-Butyl acrylate | 20 | 20 | 38 | 27 | 35 | 30 | 40 | 30 |
| Monomeric Emulsion 2 | Deionized water | 20 | 10 | 20 | 20 |  |  | 20 |  |
|  | AQUALON™ KH-10 (note 1) |  | 1 |  |  |  | 1 |  | 1 |
|  | Newcol™ 562SN (note 2) |  |  |  |  |  |  | 4 |  |
|  | Ammonium persulfate |  | 0.1 |  |  |  |  | 0.1 |  |
|  | Methacrylic acid | 5 | 5 | 5 | 3 |  | 3 | 5 |  |
|  | Acrylic acid |  |  |  |  |  |  |  | 5 |
|  | Hydroxyethyl acrylate | 10 | 8 | 10 | 5 |  |  | 10 |  |
|  | Styrene | 3 | 3 | 3 |  |  |  | 3 |  |
|  | Methyl methacrylate | 6 |  | 6 | 10 |  | 10 | 6 | 10 |
|  | Ethyl acrylate | 2 | 2 | 2 | 10 |  | 10 | 2 | 10 |
|  | n-Butyl acrylate | 4 | 2 | 4 | 12 |  | 17 | 4 | 15 |
| 5% aqueous dimethylethanolamine solution |  |  |  |  |  | 42 |  |  |  |
| Solid concentration (wt %) |  |  |  |  |  | 30 |  |  |  |
| Acid value (mgKOH/g) |  | 32 | 44 | 32 | 19 | 50 | 19 | 20 | 21 |
| Hydroxyl value (mgKOH/g) |  | 43 | 56 | 43 | 22 | 22 | 0 | 43 | 43 |

(note 2)
Newcol™ 562SN: Nippon Emulsifier Co., polyoxyethylene nonyl phenyl ether sulfuric acid ester, sodium salt; active component = 30%

Production of Polyester Resin

Production Example 9

A reactor equipped with a stirrer, reflux condenser, water separator and thermometer was charged with 109 parts of trimethylolpropane, 142 parts of 1,6-hexanediol, 126 parts of hexahydrophthalic anhydride and 120 parts of adipic acid. The temperature inside the reactor was raised from 160° C. to 230° C. over a period of 3 hours, followed by the charged components' condensation reaction at 230° C. for 4 hours. Then further 46 parts of trimellitic anhydride was added to add carboxyl groups to the resulting condensation reaction product, and reacted at 180° C. for an hour to provide polyester resin 1 having an acid value of 49 mgKOH/g, hydroxyl value of 140 mgKOH/g and number-average molecular weight of 1600.

Preparation of Thermosetting Water-Based Paint (Top Coating Base Coat Paint)

Example 1

To 40 parts of the polyester resin 1 as obtained in Production Example 9, 37.5 parts of Cymel™ 325 (Nippon Cytec Industries Co., methyl/butyl mixed etherified melamine resin, solid content=80%) and 100 parts of the water-dispersible acrylic polymer particles 1 (solid content=30%) as obtained in Production Example 1 were added under stirring. Thereafter ALUMI PASTE GX™ 180A (Asahi Chemical Industry Co., aluminum flake paste) of an amount providing 20 parts as the aluminum pigment was added under stirring, mixed and dispersed. Further dimethylethanolamine and deionized water were added to adjust the pH to 8.0 and the viscosity, to 40 seconds/Ford Cup #4/20° C., to provide a thermosetting water-based paint 1.

Examples 2-6 and Comparative Examples 1-8

Using the starting materials as identified in the following Table 2 in the amounts as indicated in the same Table, the procedures of above Example 1 were repeated to provide thermosetting water-based paints 2-14, respectively. The components' blend ratios in those thermosetting water-based paints as shown in Table 2 are by weight ratios of their solid contents.

Coating Film-Forming Method (Preparation 1 of Test Panels)

Those thermosetting water-based paints 1-14 as obtained in above Examples 1-6 and Comparative Examples 1-8 were used to provide respective test panels in the following manner, to be tested of their coating film performance.

(Substrate)

Dull steel plate of 0.8 mm in thickness which had been given a zinc phosphating treatment was electrodeposition coated with ELECRON™ 9600 (Kansai Paint, thermosetting epoxy resin cationic electrodeposition paint) to a film thickness of 20 μm, which was hardened by 30 minutes' heating at 170° C. Onto the hardened film AMILAC™ TP-65-2 (Kansai Paint, polyester-melamine resin-type intermediate paint for automobiles) was air spray coated to a film thickness of 35 μm, followed by hardening by heating at 140° C. for 30 minutes to provide a substrate to be coated.

(Coating Method)

On the above substrate, those thermosetting water-based paints as prepared in the above Examples and Comparative Examples were applied with a rotary atomizer at the booth temperature/humidity of 25° C./75%, to a film thickness of 15 μm, allowed to stand for 2 minutes and pre-heated at 80° C. for 3 minutes. Then onto the unhardened base coat surface, MAGICRON™ TC-71 (Kansai Paint, acryl-melamine resin-solvent type top coating clear paint) with its viscosity adjusted to 30 seconds/Ford Cup #4/20° C. by addition of SWASOL™ 1000 (Cosmo Petroleum Co., petroleum-derived aromatic hydrocarbon solvent) was applied with mini-bell rotary atomizer under the booth temperature/humidity of 25° C./75%, to a film thickness of 40 μm. After 7 minutes' standing, these two coating films were simultaneously hardened by heating at 140° C. for 30 minutes, to provide the test panels.

Performance Test Result 1

Performance test results of the test panels as prepared in above and the paints are concurrently shown in the following Table 2. The test methods and evaluation methods were as follows.

Appearance of coating film:

Appearance of the test panels was visually evaluated:
○: all of smoothness, gloss and image sharpness were good;
Δ: at least one of smoothness, gloss and image sharpness was inferior;
x: at least one of smoothness, gloss and image sharpness was markedly inferior.

IV value:

Measured with laser-type metallic-texture measuring apparatus (ALCOPE™ LMR-200: Kansai Paint). IV is an index of whiteness of metallic coat. Degree of whiteness increases, the more the metallic pigment used is uniformly oriented in parallel with the coated surface, giving favorable metallic appearance. Higher IV value shows higher degree of whiteness.

Metallic unevenness:

Metallic unevenness on the test panels was visually evaluated:
○: no metallic unevenness was observed;
Δ: a little metallic unevenness was observed;
x: metallic unevenness was conspicuous.

Water resistance:

The test panels were immersed in 40° C. deionized water for 240 hours, and their appearance after the immersion were examined.
○: no abnormality was observed;
Δ: no occurrence of popping or blistering was observed but blooming was perceived;
x: occurrence of both popping or blistering and blooming were observed.

Storage stability:

Condition of those thermosetting water-based paints after storage at 40° C. for 10 days was examined:
○: favorable and no problem;
Δ: minor viscosity rise in paint was observed;
x: viscosity of paint rose markedly.

TABLE 2

| | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Thermosetting water-based paint | 1 | 2 | 3 | 4 | 5 | 6 | 7 | 8 | 9 | 10 | 11 | 12 | 13 | 14 |
| Water-dispersible acrylic polymer particles 1 | 30 | 30 | 30 | | | 20 | 90 | | | | | | | |
| Water-dispersible acrylic polymer particles 2 | | | | 30 | 30 | 20 | | 4 | | | | | | |
| Water-dispersible acrylic polymer particles 3 | | | | | | | | | 30 | | | | | |
| Water-dispersible acrylic polymer particles 4 | | | | | | | | | | 30 | | | | |
| Water-dispersible acrylic polymer particles 5 | | | | | | | | | | | 30 | | | |
| Water-dispersible acrylic polymer particles 6 | | | | | | | | | | | | 30 | | |
| Water-dispersible acrylic polymer particles 7 | | | | | | | | | | | | | 30 | |
| Water-dispersible acrylic polymer particles 8 | | | | | | | | | | | | | | 30 |
| Cymel ™ 325 | 30 | 30 | 30 | 30 | 30 | 30 | 5 | 30 | 30 | 30 | 30 | 30 | 30 | 30 |
| BYHIDULE ™ VP LS2310 (note 3) | | | 10 | | | | | | | | | | | |
| SUPERFLEX ™ 410 (note 4) | | | | 10 | | | | | | | | | | |
| Polyester resin 1 | 40 | 20 | 10 | | 10 | | 66 | 40 | 40 | 40 | 40 | 40 | 40 | 40 |
| Acrylic resin 1 (note 5) | | 20 | 20 | 40 | 30 | 20 | 5 | | | | | | | |
| ALUMI PASTE ™ GX180A | | | | | | | 20 | | | | | | | |
| Appearance of coating film | ○ | ○ | ○ | ○ | ○ | ○ | Δ | ○ | Δ | Δ | X | ○ | ○ | Δ |
| IV value | 265 | 260 | 258 | 245 | 240 | 255 | 210 | 159 | 165 | 160 | 156 | 228 | 225 | 200 |
| Metallic unevenness | ○ | ○ | ○ | ○ | ○ | ○ | X | ○ | Δ | Δ | X | Δ | Δ | ○ |

TABLE 2-continued

|  | Example | | | | | | Comparative Example | | | | | | | |
| --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 |
| Water resistance | ○ | ○ | ○ | ○ | ○ | ○ | X | X | ○ | Δ | X | X | Δ | Δ |
| Storage stability | ○ | ○ | ○ | ○ | ○ | ○ | ○ | X | ○ | ○ | Δ | ○ | ○ | ○ |

(Note 3)
BYHIDULE ™ VP LS2310: Sumika Bayer Urethane Co., water-dispersibility-imparted blocked aliphatic polyisocyanate hardening agent, solid content = 40%
(Note 4)
SUPERFLEX ™ 410: Dai-ichi Kogyo Seiyaku, Co., water-dispersible urethane polymer particles (aqueous polycarbonate urethane resin liquid), solid content = 40%
(Note 5)
Acrylic resin 1: A flask was charged with 35 parts of propylene glycol monopropyl ether and heated to 85° C., into which a mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether and 2.3 parts of 2,2'-azobis(2,4-dimethylvaleronitrile) was added dropwise over a period of 4 hours. After completion of the dropping, the reaction mixture was aged for an hour. Then further a mixture of 10 parts of propylene glycol monopropyl ether and 1 part of 2,2'-azobis(2,4-dimethylvaleronitrile) was dropped into the flask over a period of 1 hour, followed by another hour's aging. Upon neutralization of the reaction product by addition of 7.4 parts of diethanolamine, acrylic resin 1 (solid concentration by weight = 55%) having a weight-average molecular weight of 58,000, hydroxyl value of 72 mgKOH/g and an acid value of 47 mgKOH/g was obtained.

Coating Film-Forming Method (Preparation 2 of Test Panels)

Two kinds of test panels were prepared using the thermosetting water-based paints 1 and 10, following descriptions of Example 7 and Comparative Example 9.

(Substrate Coated)

Onto a 0.8 mm-thick dull steel plate which had been given zinc phosphating treatment, ELECRON™ 9600 (Kansai Paint, a thermosetting epoxy resin cationic electrodeposition paint) was electrocoated to a film thickness of 20 µm, followed by heating at 170° C. for 30 minutes to form an elctrodeposited coat. This plate was used as the substrate to be coated.

Example 7

On the substrate, WP-300T™ (Kansai Paint, polyester resin/polyisocyanate hardening agent water-based intermediate paint) was applied to a film thickness of 35 µm. After 2 minutes' standing, the coated surface was preheated at 80° C. for 5 minutes and onto the unhardened water-based intermediate coating film, the thermosetting water-based paint 1 as prepared in Example 1 was applied with a rotary atomizer at the booth temperature/humidity of 25° C./75%, to a film thickness of 15 µm. After subsequent standing for 2 minutes, the film was preheated at 80° C. for 3 minutes.

Then onto the unhardened coating film of the thermosetting water-based paint 1, MAGICRON™ TC-71 (Kansai Paint, acrylic-melamine resin-solvent type top coating clear paint) whose viscosity had been adjusted by adding SWASOL™ 1000 to 30 seconds/Ford Cup #4/20° C. was applied with a minibell rotary atomizer at the booth temperature/humidity of 25° C./75% to a film thickness of 40 µm. After 7 minutes' standing, the three-layered coating film was simultaneously hardened by heating at 140° C. for 30 minutes to provide a test panel.

Comparative Example 9

Example 7 was repeated except that thermosetting water-based paint 1 was replaced with thermosetting water-based paint 10 as prepared in Comparative Example 4, to provide a test panel.

Performance Test Result 2

Results of the performance tests of so prepared test panels were as shown in Table 3. The test methods and evaluation methods were similar to those as described in respect of the Performance test result 1.

TABLE 3

|  | Example 7 | Comparative Example 9 |
| --- | --- | --- |
| Thermosetting water-based paint | 1 | 10 |
| Appearance of coating film | ○ | Δ |
| IV value | 203 | 155 |
| Metallic unevenness | ○ | Δ |
| Water resistance | ○ | Δ |

The invention claimed is:

1. A thermosetting water-based paint comprising water-dispersible acrylic polymer particles (A), crosslinking agent (B) and pigment (C),
wherein:
the water-dispersible acrylic polymer particles (A) are obtained by multi-stage emulsion polymerization of a radical polymerizable unsaturated monomeric component using an ammonium salt of a sulfonic acid group-containing compound as a reactive emulsifying agent,
the particles have a hydroxyl value within a range of 1-70 mgKOH/g and an acid value within a range of 15-50 mgKOH/g,
the radical polymerizable unsaturated monomeric component comprises an amido-containing radical polymerizable unsaturated monomer having at least two radical polymerizable unsaturated groups per molecule, methacrylic acid and a hydroxyl-containing radical polymerizable unsaturated monomer,
the content of the amido-containing radical polymerizable unsaturated monomer is within a range of 0.1-5% by weight, based on the total radical polymerizable unsaturated monomeric component, and
the water-dispersible acrylic polymer particles (A) have a core/shell structure of which the core part is crosslinked and the shell part is substantially non-crosslinked, wherein the weight ratio of the core part/shell part is within a range of 95/5-50/50.

2. The thermosetting water-based paint as set forth in claim 1, wherein the amido-containing radical polymerizable unsaturated monomer is selected from the group consisting of methylenebis(meth)acrylamide and ethylenebis(meth)acrylamide.

3. The thermosetting water-based paint as set forth in claim 1, wherein the hydroxyl-containing radical polymerizable unsaturated monomer is selected from the group consisting of monoesterified products of (meth)acrylic acid and $C_2$-$C_{10}$ dihydric alcohol and N-methylol(meth)acrylamide.

4. The thermosetting water-based paint as set forth in claim 1, wherein the radical polymerizable unsaturated monomeric component comprises the hydroxyl-containing radical polymerizable unsaturated monomer within a range of 0.1-20% by weight.

5. The thermosetting water-based paint as set forth in claim 1, wherein the water-dispersible acrylic polymer particles (A) have a hydroxyl value within a range of 5-50 mgKOH/g.

6. The thermosetting water-based paint as set forth in claim 1, wherein the water-dispersible acrylic polymer particles (A) have an average particle size within a range of 10-1,000 nm.

7. The thermosetting water-based paint as set forth in claim 1, wherein the crosslinking agent (B) is selected from the group consisting of a blocked polyisocyanate hardening agent, a water-dispersible blocked polyisocyanate hardening agent and melamine resin.

8. The thermosetting water-based paint as set forth in claim 1, which contains 5-80 parts by weight of the water-dispersible acrylic polymer particles (A) in terms of solid, based on the solid weight of the resin content in the thermosetting water-based paint.

9. The thermosetting water-based paint as set forth in claim 1, which contains 5-80 parts by weight of the crosslinking agent (B) in terms of solid, based on the solid weight of the resin content in the thermosetting water-based paint.

10. The thermosetting water-based paint as set forth in claim 1, which contains 1-250 parts by weight of pigment (C) per 100 parts by weight of solid resin content in the thermosetting water-based paint.

11. The thermosetting water-based paint as set forth in claim 1, comprising an additional resin component.

12. The thermosetting water-based paint as set forth in claim 11, in which the additional resin component is selected from the group consisting of acrylic resin and polyester resin.

13. The thermosetting water-based paint as set forth in claim 1, further comprising water-dispersible urethane polymer particles.

14. A method for forming multi-layered coating film which comprises applying the thermosetting water-based paint as set forth in claim 1 onto an object to be coated, as a base coat paint, further applying a clear coat paint onto the unhardened base coat-applied surface, and thereafter simultaneously hardening the base coat and clear coat.

15. A method for forming multi-layered coating film which comprises applying onto an object to be coated an intermediate paint, applying onto the unhardened intermediate coat-applied surface the thermosetting water-based paint as set forth in claim 1 as a base coat paint, further applying onto the unhardened base coat-applied surface a clear coat paint, and thereafter simultaneously hardening the three-layered coating film of the intermediate coat, base coat and clear coat.

16. Articles coated with the thermosetting water-based paint as set forth in claim 1, or by the method as set forth in claim 14 or claim 15.

* * * * *